3,565,851
ORGANOPOLYSILOXANE COATINGS

Charles George Neuroth, Blissfield, Mich., assignor, by mesne assignments, to Stauffer-Wacker Silicone Corporation, a corporation of Delaware
No Drawing. Continuation of application Ser. No. 631,129, Apr. 17, 1967. This application Sept. 19, 1969, Ser. No. 859,476
Int. Cl. C08g 47/10, 51/04
U.S. Cl. 260—37     9 Claims

ABSTRACT OF THE DISCLOSURE

The present invention relates to curable coating compositions comprising grafted organopolysiloxanes and inert fillers which may be applied to substrates as a surface coating. These coating compositions are particularly useful in areas of heavy traffic since they are resistant to abrasion and exhibit excellent adhesion properties.

---

This is a continuation of Ser. No. 631,129 filed Apr. 17, 1967, now abandoned.

This invention relates to coating compositions and more particularly to organopolysiloxane coating compositions.

Heretofore, it has been known that organopolysiloxanes make excellent high temperature coatings for various substrates, such as metal, wood and the like. It has also been known that these coatings are more resistant to corrosion than similar coatings made from organic materials. However, even though the organopolysiloxanes protect metal and glass surfaces from corrosion better in most cases than organic resins, they leave much to be desired in the way of protection for surfaces subjected to rigid conditions, such as those encountered in dimensional changes in the substrate caused by severe changes in the temperature. In addition, the organopolysiloxanes heretofore employed require higher curing temperatures and longer curing times than is required by the conventional organic resins.

Furthermore, it has been known, prior to this application, that organopolysiloxane resins were substantially nonresistant to abrasion, particularly in areas subjected to heavy traffic.

Therefore, it is an object of this invention to provide an organopolysiloxane coating composition. Another object of this invention is to provide a flexible organopolysiloxane coating composition. Still another object of this invention is to provide a flexible coating composition which is resistant to abrasion. Still another object of this invention is to provide a coating composition which will adhere to substrates and withstand extreme and repeated changes in temperature without separating from the substrate. A further object of this invention is to provide a non-porous heat resistant coating composition. A still further object of this invention is to provide a method for adhering a grafted organopolysiloxane to a substrate.

The foregoing objects and others which will become apparent from the following description are accomplished in accordance with this invention, generally speaking, by providing an abrasion resistant coating composition containing a curable grafted organopolysiloxane and an inert filler.

In other words, it has been found that inert fillers, such as organic and inorganic materials may be added to an organopolysiloxane containing terminal hydroxyl groups or in lieu thereof, terminal groups hydrolyzable by ambient moisture and having at least one polymeric group grafted to the organopolysiloxane to form a coating composition which is resistant to abrasion and at the same time will withstand extreme and repeated temperature changes without separating from the substrate.

The organopolysiloxanes contemplated in this invention may be represented by the following formula:

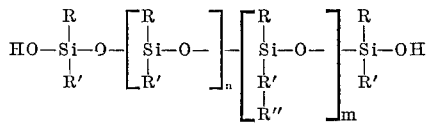

wherein R and R′ are organo groups which may be the same or different and contain from 1 to 18 carbon atoms, R″ is a monomeric or polymeric group grafted to the organic radicals represented by R or R′ above, $n$ is an integer of from 10 to 1,000 and $m$ is an integer of from 1 to 100.

The organopolysiloxanes which are combined with the monomeric compounds may be represented broadly by the formula:

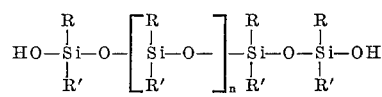

wherein R and R′ are the same as those represented above and are selected from the group consisting of alkyl, cycloalkyl, aryl, alkoxy, cyclo-alkoxy and aryloxy groups and $n$ is the same as shown in the formula above. Of the different organopolysiloxanes, the alkyl polysiloxanes are preferred, particularly the lower alkyl polysiloxanes and more preferably the methylpolysiloxanes.

Grafting of the monomeric or polymeric groups to the organopolysiloxanes is expeditiously carried out by using a free-radical initiator, normally a peroxide. As little as 0.05 percent of the more active peroxide initiators based on the weight of the reactants is adequate in most cases. Where increased reaction rates are desired, as much as 2 percent or even more of the initiator may be used. In general, it is advisable not to exceed about 1.0 percent since higher concentrations tend to promote coupling reactions, which understandably increase the viscosity of the reaction mixture.

In using a free-radical initiator, the reaction, when carried out in a batch-wise process, generally proceeds at a satisfactory rate if the temperature is maintained in the area of about 60° C. to about 130° C. If a continuous process is used or if the reaction is carried out batch-wise without a free-radical initiator, substantially higher temperatures such as, up to about 160° C. may be advantageously employed.

The most suitable peroxide initiators are those in which at least one of the peroxide oxygens is attached to a tertiary-carbon atom. Exemplary of these initiators are: dialkyl peroxides such as di-tertiary-butyl and dicumyl peroxide; hydroperoxides such as tertiary-butyl hydroperoxide, cumyl hydroperoxide and decylene hydroperoxide; cyclic peroxides such as ascaridole and 1,5-dimethylhexane-1,5-peroxide; and peresters such as tertiary-butyl perbenzoate, tertiary-butyl peroxyiso-propylcarbonate and tertiary-butyl peroctoate. Ketone peroxides such as acetone peroxide and cyclo-hexanone peroxide are also applicable.

Acyl peroxides and peracids may be used in the practice of the invention, but in general they result in less grafting, i.e., lower yields of the grafted product. The difference is believed to lie in the nature of the radicals produced, thus tertiary-alkoxy radicals from di-tertiary-butyl peroxide, for example, have a strong tendency to extract hydrogen atoms which is a necessary step in the grafting procedure. On the other hand, acyloxy radicals produced from acyl peroxide, e.g., benzoyl peroxide, while effective initiators are relatively ineffective as hydrogen extractors.

Although it may be possible to carry out the grafting procedure using organopolysiloxane material free of terminal hydroxy groups or groups hydrolyzable by ambient moisture and to subsequently treat the graft polymer to incorporate such groups, it is preferred in the grafting operation to start with an organopolysiloxane having terminal hydroxy groups. Following this procedure, the grafted polymer is appropriately treated to convert the hydroxy groups to groups which are hydrolyzable by ambient moisture.

The hydroxy organopolysiloxane material may contain in minor proportions molecules having only one hydroxyl group or there may be a small number of molecules present carrying in excess of two hydroxyl groups. It is preferred, in any event, that the hydroxy organopolysiloxane material average out to from about 1.75 to about 2.25 hydroxyl groups per molecule.

It is believed that the chain length of the polysiloxane is important, atlhough grafting has been found to occur in siloxane of almost any chain length. Where the siloxane material contains molecules of short chain length, many of these will remain ungrafted. On the other hand, very long chain material results in a grafted product which is extremely viscous and difficult to handle in some applications. Therefore, it is preferred that the hydroxy polysiloxanes have a degree of polymerization between about 100 and 5,000. This is equivalent to a viscosity between about 100 and about 50,000 c.p.s. Most preferable, the viscosity of the hydroxy polysiloxanes should lie within the range of from about 200 to 10,000 c.p.s. Where an easily pourable grafted product is desired, optimum results are usually achieved in the lower portion of such ranges, i.e., 300 to 1,000 c.p.s.

The proportion of organic monomer or polymers used in the grafting reaction may be varied within wide limits; however, it has been found that greatly improved physical properties have been obtained where the reaction mixture contains from about 25 to 75 percent by weight of organic monomer or polymers. It is preferred that the organic monomer polymer portion account for from about 40 to 65 percent of the total weight of reactants.

Organic monomeric compounds which are applicable in the invention are many and varied. They include branched and straight chained monomeric olefins having from 1 to 18 carbon atoms such as ethylene, propylene, butylene, isobutylene, isoprene, butadiene, hexylene, octylene, 1-decene, dodecene; unsaturated aromatic hydrocarbons such as styrene, alpha-methylstyrene, alpha-ethylstyrene, alpha-butylstyrene, and vinyl toluene and the like. Other monomeric compounds which may be used are the halogenated mono-olefinic hydrocarbons such as chloroprene, chlorostyrene, alpha-bromostyrene, 3,4-difluorostyrene, 2,5-dichlorostyrene, 2,5-dibromostyrene, 3,4-dichlorostyrene, ortho-, meta- and para-fluorostyrenes, 2,6-dichlorostyrene, 2,6-difluorostyrene, 3,4-chlorostyrene, 3-chloro-4-fluorostyrene, 2,4,5-trichlorostyrene, dichloro-monofluorostyrene, chloroethylene, 1-1,dichloroethylene, phenylethylene, fluoroethylene, iodoethylene, 1,1-dibromoethylene, 1,1-difluoroethylene, 1,1-diiodoethylene and the like. Examples of unsaturated acids which may be used are vinyl acetic acid, acrylic acid, methacrylic acid, crotonic acid, 3-butenoic acid, cinnamic acid, maleic acid, trimethyl maleic acid, lauric acid, oleic acid, linoleic acid, lenolenic acid and the like. Other compounds which may be used are esters of organic acids such as vinyl acetate, vinyl propionate, vinyl butyrate, vinyl isobutyrate, vinyl valerate, vinyl caproate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate, methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, and dodecyl acrylate, isopropenyl acetate, isopropenyl propionate, isopropenyl butyrate, isopropenyl isobutyrate, isopropenyl valerate, isopropenyl caproate, isopropenyl benzoate, isopropenyl p-chlorobenzoate, isopropenyl o-bromobenzoate, isopropenyl m-chlorobenzoate, isopropenyl toluate, isopropenyl alpha-chloroacetate, and isopropenyl alpha-bromopropionate, vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate, allyl chlorocarbonate, allyl formate, allyl acetate, allyl propionate, allyl butyrate, allyl valerate, allyl caproate, diallyl phthalate, diallyl succinate, diethylene glycol bis-(allyl carbonate), allyl-3,5,5-trimethylhexoate, diallyl adipate, diallyl subacate, diallyl fumarate, ally benzoate, allyl acrylate, allyl crotonate, allyl oleate, allyl choroacetate, allyl trichloroacetate, allyl chloropropionate, allyl chlorovalerate, allyl lactate, allyl pyruvate, allyl aminoacetate, allyl acetoacetate, allyl thioacetate, as well as methyl esters corresponding to the above allyl esters, as well as esters from such alkenyl alcohols as beta-ethyl allyl alcohol, beta-propyl allyl alcohol, 1-buten-4-ol, 2-methyl-buten-1-ol-4, 2-(2,2-dimethylpropyl), 1-buten-4-ol and 1-penten-4-ol, methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyanoacrylate and decyl alpha-cyanoacrylate, ethyl alpha-cyanoacrylate and amyl alpha-cyanoacrylate, dimethyl maleate, diethyl maleate, diallyl maleate, dimethyl fumarate, dimethylallyl fumarate and the like.

Other organic monomeric compounds which may be used are the organic nitriles such as acrylonitrile, methacrylonitrile, ethacrylonitrile, crotonitrile and the like; unsaturated mercaptans such as allyl mercaptan and unsaturated sulfides such as allyl sulfide and vinyl sulfide; unsaturated ketones such as methyl vinyl ketone, allyl acetone and benzolacetophone; unsaturated iso-cyanates such as allyl isocyanate, cinnamyl isocyanate; unsaturated iso-thiocyanates such as allyl isothiocyanate, cinnamyl isothiocyanate; amides such as acrylamide, alpha-methyl acrylamide, N-phenyl acrylamide, N-methyl-N-phenyl acrylamide, N,N-methylene bis-acrylamide, N-tert-butyl acrylamide and other N-tert-alkyl acrylamides and the like. Other vinyl compounds which may be used are the vinyl aromatics such as vinyl pyridine, vinyl naphthylene, divinyl benzene; N-vinyl compounds such as vinyl carbazole, N-vinyl pyrrolidone and N-vinyl caprolactam; as well as vinyl silicone compounds such as vinyl triethoxysilane.

Disubstituted ethylenes of the type $CH_2=CX_2$ may be used including vinylidene fluoride, vinylidene chloride, vinylidene cyanide and compounds derived from or related to methacrylic acid including the salts, esters and amides as well as methacrolein and the like.

Other disubstituted ethylenes of the type $CHX=CHX$ comprised of vinylene carbonate and various monomers which polymerize best in the presence of other monomers, e.g., maleic anhydride, stilbene, indene and coumarone may be used in the formation of graft polymers of this invention.

As mentioned previously, the monomers or polymers may be used singly or in combinations of two or three or even more. The properties of the grafted product, of course, depend on the nature and identify of the monomeric and polymeric material, as well as on the amounts used relative to the organopolysiloxanes. Monomers that give elastomeric homopolymers generally provide elastomeric grafted products while those that give plastic homopolymers tend to yield grafted products which are less elastic. By using at least one monomer from each class, grafted products can be obtained having physical properties which heretofore cannot be approached by prior composition.

For example, by using various combinations of monomers and polymers, it is possible to modify the glass transition temperature of the grafted polymer and at the same time provide a polymer having greatly improved physical properties such as tensile strength, tear strength and elongation. In other words, the glass transition temperature and the physical properties of the grafted polymer may be greatly influenced by the monomers or polymers grafted to the hydroxy terminated polysiloxane.

Organopolysiloxanes having grafted thereto monomers such as styrene and substituted styrenes in conjunction with acrylates, methacrylates, acrylonitriles and the like have excellent physical properties. Examples of styrene combinations which have been successfully graft polymerized with hydroxy-terminated polydimethylsiloxanes are styrene-butylacrylate,
styrene-butylmethacrylate,
styrene-butylacrylate-acrylonitrile,
styrene-acrylic acid,
styrene-2-ethylhexylacrylate,
styrene-2-ethylhexylacrylate-butylacrylate,
styrene-ethylmethacrylate,
styrene-butylacrylate-acrylamide,
styrene-butylacrylate-maleic anhydride,
styrene-butylacrylate-acrylic acid,
styrene-isobutylmethacrylate,
acrylonitrile-butylacrylate,
acrylonitrile-ethylacrylate-butylacrylate and the like. Other monomers which have been grafted to the organopolysiloxanes are acrylic acid, vinyl chloride, vinylidene chloride, vinylidene fluoride, 2-ethyl-hexylacrylate, lauryl methacrylate, dimethylamino-methacrylate, 2-hydroxy-ethylmethacrylate and the like.

Where a combination of monomers is employed, the relative proportion of each monomer is, of course, determined by the characteristics desired in the cured composition. In general, compositions having a desirable balance of properties result, for example, when the ratio of acrylate to styrene or other vinyl aromatic compound is in the range of from about 1:3 to 3:1 on a weight basis.

Although it is not essential, it is preferred that fillers be incorporated in the modified organopolysiloxanes in order to impart desirable abrasion resistant properties to the coating compositions. Examples of suitable fillers are: fumed silicas, high-surface area precipitated silicas, silica aerogels as well as coarser silicas such as diatomaceous earths, crushed quartz and the like. Other fillers which may be used are metallic oxides such as titanium oxide, ferric oxide, zinc oxide, and fibrous fillers such as asbestos, fibrous glass and the like.

Even though the particle size of the fillers is not critical, it is preferred that they range from about 0.14 mm. up to about 2 mm. in diameter. Particles of larger diameter may be used; however, it was found that particles having the above diameter provide a more desirable coating composition.

Where fillers are incorporated in the grafted organopolysiloxanes, it is preferred that their surfaces be modified by treating them with organotrihalosilanes having the formula $R'''SiX_3$ or organoalkoxysilanes having the formula $(R''')_zSi(OR'''')_{4-z}$ wherein $R'''$ is a monovalent hydrocarbon radical having from 1 to 8 carbon atoms, X is a halogen group, $R''''$ is an alkyl group having from 1 to 8 carbon atoms and z is an integer of from 1 to 2. In treating the fillers in this manner, their surfaces are modified to make them more compatible with the organopolysiloxanes. The monovalent hydrocarbon radical may be any alkyl radical such as methyl, ethyl, isopropyl, tert-butyl, hexyl, or octyl; any alkenyl radical such as the vinyl, allyl or hexenyl radicals; any alkaryl hydrocarbon radical such as benzyl or beta-phenylethyl radicals and any hydrocarbon radical such as phenyl, tolyl, xylyl and the like. Examples of suitable organohalosilanes are ethyltrichlorosilane, propyltrichlorosilane, butyltrichlorosilane, hexyltrichlorosilane, octyltrichlorosilane, propyltribromosilane, butyltribromosilane, octyltribromosilane, ethyltrifluorosilane, propyltrifluorosilane, butyltrifluorosilane, hexyltrifluorosilane, octyltrifluorosilane, ethyltriiodosilane, butyltriiodosilane, hexyltriiodosilane, and octyltriiodosilane, vinyltrichlorosilane, allyltrichlorosilane, hexenyltrichlorosilane, phenyltrichlorosilane, phenyltrifluorosilane, tolyltrichlorosilane, tolyltrifluorosilane, benzyltrichlorosilane, benzyltrifluorosilane and the like.

When silica is incorporated as a filler in the grafted organopolysiloxanes, it is preferred that the silica be first moistened with water and then treated with an organotrihalosilane such as methyltrichlorosilane, washed with water to remove the hydrogen chloride formed from hydrolysis and thereafter dried. The treated silica may then be mixed with the hydroxy-terminated grafted organopolysiloxane by any conventional mixing apparatus.

While silica has been illustrated as the preferred filler, other fillers described herein have been treated in substantially the same manner and have been incorporated in the grafted organopolysiloxane. The amount and type of filler used in combination with the organopolysiloxanes in preparing the novel abrasion resistant compositions of the present invention can obviously be varied within wide limits; for example, a range of from about 10 to about 400 parts of filler per 100 parts by weight of the grafted organopolysiloxane; preferably from about 200 to 350 parts of the filler per 100 parts by weight of the organopolysiloxane is operable in the present invention. Also, mixtures of fillers in all proportions by weight may be employed in the practice of the present invention.

In addition, it has been found that the adhesion between the substrate and the coating composition may be greatly enhanced if the substrate is first primed with organoacyloxysilanes having the following general formulas:

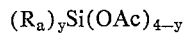

and

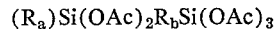

wherein $R_a$ is a monovalent hydrocarbon radical or halogenated monovalent hydrocarbon radical; $R_b$ is a divalent hydrocarbon radical; Ac is a saturated aliphatic monoacyl radical derived from a carboxylic acid and y is an integer of from 1 to 2. For the purposes of this invention, $R_a$ may be a hydrocarbon radical having from 1 to 8 carbon atoms, e.g., any alkyl radical such as the methyl, ethyl, isopropyl, tert-butyl, hexyl or octyl radicals; any alkenyl radical such as vinyl, allyl or hexenyl radicals; any alkaryl hydrocarbon radical such as benzyl or beta-phenylethyl radicals; and any aromatic hydrocarbon radical such as phenyl, tolyl or xylyl radicals. $R_a$ can also be any halogenated monovalent hydrocarbon radical such as chloromethyl, pentafluorobutyl, trifluorovinyl, chlorophenyl, bromophenyl, α-α-α-trifluorotolyl or iodophenyl radical. $R_b$ is a divalent hydrocarbon radical having from 1 to 8 carbon atoms Examples of suitable divalent radicals are methylene, ethylene, propylene, butylene, hexylene, octylene, phenylene and the like. The Ac groups can be any saturated aliphatic monoacyl radical such as propionyl, butyryl, hexoyl, 2-ethylhexoyl, octanoyl, isovalerylstearyl and the like.

In treating the substrate, the organoacyloxysilane primers may be applied directly to the surface of the substrate or they may be dissolved in volatile organic solvents and then applied to the surface of the substrate as a dilute solution. Examples of organic solvents which may be used are aliphatic hydrocarbons such as hexane, octane, decane and the like; halogenated aliphatic hydrocarbons such as 1,1,1-trichloroethane, 1,1-dichloroethane, 1,1,2-trichloroethane, tetra-chloromethane, trichloromethane, dichloromethane and the like; ethers such as diethyl ether, diisopropyl ether, ethylpropyl ether, dibutyl ether, ethylbutyl ether, propylbutyl ether, amyl ether and the like. Other organic solvents which may be used are benzene, toluene, xylene, naphthas (VMP Boiling Range 100° to 160° C.), tetrahydronaphthylene and the like.

The acyloxysilane primers may be applied to the substrate by any conventional technique known in the art, for example, they may be applied by brushing, spraying or dipping, either as a concentrated or dilute solution. It is preferred, however, that they be applied as a dilute solution containing from about 5 to about 50 percent by weight of the acyloxysilane.

The drying rate of the acyloxysilane primer is primarily dependent on two factors. One factor is the rate of condensation of the silanes or partial hydrolyzates thereof which is dependent; first on the size of the monovalent hydrocarbon radical and the Ac radical; and second on the amount of water present for hydrolysis of the Ac radicals to volatile acids. Where the radicals $R_a$ and Ac are larger than the claimed limits, the rate of hydrolysis and condensation of the acyloxysilanes is reduced to the point where they will not dry satisfactorily. On the other hand, where the acyloxysilane is exposed to water as, for example, in the form of steam, hydrolysis and condensation is accelerated.

Another factor in the drying of the acyloxysilane primers is the presence or absence of solvent. If a solvent is employed, the volatility of the solvent effects the drying rate of the composition. Consequently, the solvent should be sufficiently volatile to evaporate under coating conditions at least as rapidly as the acyloxysilane is hydrolyzed and condensed.

Due to the possible variations in the two factors above, it is impossible to establish specific drying times for the acyloxysilane primers. Generally, the drying time will vary from a few seconds to a few hours.

As mentioned previously, the organopolysiloxane coating compositions of this invention may be prepared by mixing grafted hydroxy-terminated polysiloxanes with acyloxysilanes having the formula $(R_a)_y Si(OAc)_{4-y}$ or $R_a Si(OAc)_2 R_b Si(OAc)_3$ wherein $R_a$, $R_b$, Ac and $y$ are the same as those defined above and thereafter curing the reaction product in the presence of air. The reaction between these acyloxysilanes and the grafted hydroxy-terminated polysiloxanes occurs spontaneously upon mixing the two reactants. The inert filler may be incorporated in the grafted hydroxy-terminated polysiloxanes prior to mixing with the acyloxysilanes or it may be added to the reaction product prior to curing.

In order to obtain a flexible coating composition, at least one mol of acyloxysilane should be used per mol of silica bonded hydroxyl in the polysiloxane. Generally, it is best to employ more than one mol of acyloxysilane per silicon bonded hydroxyl group. The excess of acyloxysilane insures complete reaction with all of the silicon-bonded hydroxyls and in addition, it acts as a scavenger for any moisture which may be present. Generally, the reactants are mixed in the absence of moisture since the latter initiates the curing reaction; however, traces of moisture can be tolerated, particularly when an excess of acyloxysilane is employed.

The reaction between the polysiloxanes and the acyloxysilanes may be carried out at any convenient temperature, although in general, temperatures ranging from about 20° C. to about 100° C. are sufficient. Higher or lower temperatures may be employed if desired, although it is preferred that the reaction be carried out at temperatures below about 200° C.

In addition, this reaction may be carried out in the presence of an inert solvent, that is a solvent which will not react with the acyloxy groups on the silicon atom. Suitable solvents include hydrocarbons such as benzene, toluene, xylene and the like; halogenated solvents such as perchloroethylene or chlorobenzene; organic ethers such as diethyl ether and dibutyl ether; ketones such as ethylisobutyl ketone and fluid hydroxyl-free polysiloxanes. The presence of a suitable solvent is particularly desired when the hydroxylated polysiloxane is very viscous or in the form of a high molecular weight gum. In these cases, the solvent reduces the overall viscosity of the mixture and facilitates the reaction. If desired, the composition may be kept in the solvent until it is to be used. This is particularly valuable when a highly viscous or gummy product is to be employed in the coating applications.

These acyloxy containing grafted organopolysiloxanes may be cured by merely exposing them to moisture in the atmosphere or in the presence of additional water vapor at room temperature. Upon exposure to moisture, cross-linking of the composition occurs at times varying from a few minutes to several hours depending upon the type of acyloxy group, the type of $R_a$ groups present and the thickness of the coating on the substrate. In general, an increase in the molecular weight of either group will increase the curing time.

In addition to the one-component system described above, it is possible to use a two-component system for preparing the polysiloxane coating compositions of this invention. Such a two-component system comprises a polymer, a cross-linker and a catalyst, the latter being added just prior to use. In this system hydroxy-terminated grafted polysiloxanes are mixed with a metallic salt catalyst and a polyalkoxysilane of the formula

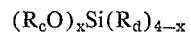

$$(R_c O)_x Si(R_d)_{4-x}$$

or a polyalkoxysiloxane in which the silicon atoms are linked through Si—O—Si linkages and the remaining valences of the silicon atoms are satisfied by $R_c O$ and $R_d$. In the above formula, the groups represented by $R_c$ are monovalent hydrocarbon radicals having less than 8 carbon atoms, while those represented by $R_d$ are monovalent hydrocarbon radicals or halogenated hydrocarbon radicals of less than 8 carbon atoms with $x$ having a value of 3 to 4. Examples of monovalent hydrocarbon radicals represented by $R_c$ are methyl, ethyl, propyl, butyl, hexyl, octyl, phenyl, vinyl, allyl, ethyl-allyl, butadienyl and the like. Radicals represented by $R_d$ may be any of the radicals represented by $R_c$ above, as well as the corresponding halogenated groups such as chloromethyl, 2-bromo-4,6-diiodophenyl, 1,2-difluorovinyl, 3,4-difluoro-cyclopentyl, 2-bromo-cyclopentene-2,3-yl and 6-chloro-hexyl.

The polyalkoxysilanes employed herein include mono-organotrihydrocarbonoxy silanes, tetra-hydrocarbonoxy silanes, e.g., orthosilicates and partial hydrolyzates of such silanes. The polyalkoxy compounds, e.g., ethyl orthosilicate or a partially hydrolyzed ethyl silicate such as ethyl silicate "40" which consists primarily of decaethyl tetrasilicate are representative of these compounds.

The polyalkoxysilanes and siloxanes employed herein may be used either alone or in combination and should be used in a proportion of from about 0.5 to about 10 percent, preferably from about 1 to 5 percent by weight based on the weight of the grafted organopolysiloxane. If the total weight of the polyalkoxysilanes or polyalkoxysiloxanes is below about 0.5 percent based on the weight of the grafted organopolysiloxane, very little cross-linking will occur. If on the other hand, the total weight of the polyalkoxysilanes or siloxanes is above about 10 percent based on the weight of the grafted organopolysiloxane, the curing time will not be substantially reduced.

Other polyalkoxysilanes which may be used either alone or in combination with these described above are: isopropyl orthosilicate, amyl orthosilicate, allyl orthosilicate, pentyl orthosilicate, diethyldipropyl orthosilicate, hexyl orthosilicate, methyl propylsilicate, ethyl polysilicate, isopropyl polysilicate, secondary-amyl polysilicate, n-butyl polysilicate and mixtures thereof. As mentioned previously, these silicates may be present in amounts up to about 10 percent by weight based on the weight of grafted organopolysiloxanes.

The curing of these coating compositions is brought about by mixing the hydroxy-terminated grafted polysiloxane with the polyalkoxysilanes or polyalkoxysiloxanes in the presence of a catalyst comprising a metal salt of carboxylic acid. Examples of these metals include lead, tin, nickel, cobalt, iron, cadmium, chromium, zinc, manganese, aluminum, magnesium, barium, strontium, calcium, cesium, rubidium, potassium, sodium and lithium. Any carboxylic acid salt of these metals is operative in this invention, providing the carboxylic acid radical contains less than 16 carbon atoms. It is preferable that the salt be soluble in the hydroxy-terminated grafted polysiloxane, although insoluble salts may be employed if they are properly dispersed in the system. They may be dispersed by employing a solution of the catalyst in a mutual solvent with the hydroxy-terminated grafted polysiloxane or the catalyst may be dispersed on a filler and thereafter milled into the organopolysiloxane.

Specific examples of salts which are operative in this invention are the naphthenates of the above metals such as lead naphthenate, cobalt naphthenate, zinc naphthenate, sodium naphthenate; salts of fatty acids such as iron-2-ethylhexoate, lead-2-ethylhexoate and chromium octoate; salts of aromatic carboxylic acids such as dibutyltindibenzoate; salts of polycarboxylic acids such as dibutyltinadipate, lead sebacate; and salts of hydroxyl carboxylic acids such as dibutyltindilactate. Examples of other compounds which may be used as catalysts are dibutyltinbutoxychloride, dibutyltindilaurate and the like.

Generally, the amount of catalyst used is dependent on the rate desired and the activity of the compound in question. In addition, the amount of catalyst may vary depending upon the particular use for the product, for example, when a particularly fast cure is desired, more catalyst may be used. If one wishes to delay the cure, for example, where an application for extensive fabrication time is required, less catalyst is used. In general, the amount of catalyst will vary from about 0.1 to about 5.0 percent, preferably from about 0.2 to about 1.0 percent based on the weight of the hydroxy-terminated grafted polysiloxane. A mixture of two or more of the above salts may be used if desired.

The coating compositions of this invention may be compounded in the usual manner for compounding conventional siloxane elastomers. However, where the materials are stored prior to use, it is essential that the catalyst, e.g., carboxylic acid salt or the polyalkoxysilane or polyalkoxysiloxane be stored separately. In other words, the hydroxy-terminated grafted polysiloxane, filler and the polyalkoxysilane or polyalkoxysiloxane may be compounded and the catalyst added just prior to use or the hydroxy-terminated grafted polysiloxane filler and catalyst may be compounded and then the polyalkoxysilane or polyalkoxysiloxane added just prior to use. The inert filler may be added either to the hydroxy-terminated grafted polysiloxane, the polyalkoxysilane or the polyalkoxysiloxane prior to the addition of the catalyst or immediately after the reactants have been combined.

Curing of the coating composition of this invention takes place spontaneously at room temperature upon mixing the defined ingredients, i.e., the hydroxy-terminated grafted polysiloxane, catalyst and the polyalkoxysilane or polyalkoxysiloxane or mixtures thereof.

The compositions of this invention are useful as coatings for concrete, wood surfaces, metal surfaces, ceramic surfaces and surfaces of such materials as cured resin laminates where heavy traffic or abrasion is encountered. In addition, these elastomeric coating compositions are uneffected by dimensional changes in the substrate caused by severe changes in the temperature.

Other additives such as pigments, antioxidants, ultraviolet absorbents and the like, may be included in the compositions of this invention.

Various embodiments of this invention are further illustrated in the following examples in which all parts are by weight, unless otherwise specified.

PREPARATION OF HYDROXY-TERMINATED GRAFTED POLYSILOXANES

Example 1

To a stainless-steel reactor are added about 625 parts of styrene, about 570 parts of butylacrylate, about 797 parts of a hydroxy-terminated polydimethylsiloxane fluid and about 5.98 parts of ditert-butylperoxide. The mixture is heated to about 130° C. and agitated at about 320 r.p.m. for about 4 hours. The residual monomers are removed at about 130° C. under a reduced pressure of about 400 mm. Hg. The viscosity of the recovered reaction product is about 53,200 cps. at 25° C.

Example 2

To a stainless-steel reactor are added about 104 parts of styrene, about 85.5 parts of butylacrylate, about 126 parts of a hydroxy-terminated polydimethylsiloxane fluid having a viscosity of about 2,000 cps. and about 1.2 parts of ditert-butylperoxide. The mixture is heated to a temperature of between about 120° and 127° C. with agitation for a period of about 4 hours. The residual monomers are removed under reduced pressure at a temperature of about 117° C. The viscosity of the reaction product is about 40,800 cps. at a temperature of about 30° C.

Example 3

Approximately 250 parts of styrene, about 204 parts of butylacrylate, about 304 parts of a hydroxy-terminated polydimethylsiloxane fluid having a viscosity of about 610 cps. and about 2 parts of ditert-butylperoxide are added to a stainless-steel reactor. The mixture is heated to about 125° C. and stirred at about 80 r.p.m. for about 24 hours. The residual monomers are then removed at a temperature of about 125° C. under reduced pressure. The product thus obtained is a white opaque liquid having a viscosity of about 14,500 cps.

Example 4

To a stainless-steel reactor are added about 14,000 parts of a hydroxy-terminated polydimethylsiloxane fluid having a viscosity of about 6,700 cps., about 180 parts of vinylchloride and about 7 parts by volume of tert-butylperoctoate. The reaction mixture is heated to about 80° C. and agitated for a period of about 4 hours. The monomer is then removed under reduced pressure at a temperature of about 80° C. yielding a clear, pale purple fluid.

Example 5

Approximately 184 parts by volume of vinylacetate, about 172 parts of a hydroxy-terminated polydimethylsiloxane fluid having a viscosity of about 1,900 cps. and about 0.2 part by volume of tert-butylperoctoate are charged to a stainless-steel reactor. The reaction mixture is heated to a temperature of about 80° C. and reacted for about 6 hours with agitation. The unreacted monomer is removed under reduced pressure at a temperature of about 80° C. yielding a white opaque, viscous fluid.

Examples 6 to 17

In Examples 6 to 17 acrylonitrile and butylacrylate are reacted with hydroxy-terminated polydimethylsiloxane fluids in varying monomeric charging ratios, polymerization temperatures and polymerization times. At the end of the polymerization period, the unreacted monomers are removed under a vacuum of about 1 mm. Hg while continuing to heat and stir for an additional hour. The pertinent data is illustrated in Table I.

TABLE I

| Example No. | Monomer Acrylonitrile, parts | Monomer Butyl acrylate, parts | Hydroxylated fluid Viscosity, cps. | Hydroxylated fluid Parts | Catalyst Type | Catalyst Parts | Reaction conditions Temp., °C. | Reaction conditions Time, hrs. | Final polymer viscosity, cps. at 25° C. |
|---|---|---|---|---|---|---|---|---|---|
| 6 | 14.6 | 35.4 | 1,900 | 50 | t-BP | 0.5 | 80 | 0.5 | |
| 7 | 14.6 | 35.4 | 1,928 | 50 | t-BP | 0.5 | 80 | 1.5 | 14,000 |
| 8 | 9.0 | 51.0 | 800 | 40 | t-BP | 0.5 | 80 | 1.7 | 7,800 |
| 9 | 9.0 | 51.0 | 320 | 40 | t-BP | 0.5 | 80 | 2.3 | 6,600 |
| 10 | 9.0 | 51.0 | 800 | 40 | t-BP | 0.5 | 80 | 4.0 | 20,600 |
| 11 | 9.0 | 51.0 | 800 | 40 | t-BP | 0.5 | 80 | 4.0 | 20,600 |
| 12 | 9.0 | 51.0 | 800 | 40 | t-BP | 0.5 | 80 | 3.0 | 13,600 |
| 13 | 9.0 | 51.0 | 800 | 40 | t-BP | 0.5 | 70 | 4.3 | 26,600 |
| 14 | 9.0 | 51.0 | 800 | 40 | t-BP | 0.5 | 70 | 4.3 | 26,600 |
| 15 | 9.0 | 51.0 | 800 | 40 | t-BP | 0.5 | 60 | 2.0 | |
| 16 | 12.9 | 47.1 | 800 | 40 | t-BP | 0.5 | 70 | 4.0 | 84,200 |
| 17 | 12.9 | 47.1 | 800 | 40 | t-BP | 0.5 | 70 | 4.0 | 84,200 | t-BP = tert-butylperoxide.

Examples 18 to 28

In Examples 18 to 28, various monomers are reacted with hydroxy-terminated polydimethylsiloxane fluids in varying monomeric charging ratios and polymerization times. The data is illustrated in Table II.

TABLE II

| Example No. | Monomers Type | Parts | Hydroxylated fluid Viscosity, cps. | Parts | Catalyst Type | Parts | Reaction conditions Temp., °C. | Time, hrs. |
|---|---|---|---|---|---|---|---|---|
| 18 | Ethyl acrylate | 50 | 400 | 50 | t-BP | 0.5 | 80 | 4 |
| 19 | do | 60 | 400 | 40 | t-BP | 0.5 | 80 | 4 |
| 20 | Butyl acrylate | 60 | 400 | 40 | t-BP | 0.5 | 80 | 4 |
| 21 | Methyl acrylate | 50 | 400 | 50 | t-BP | 0.5 | 80 | 4 |
| 22 | Acrylic acid | 50 | 400 | 50 | t-BP | 0.5 | 80 | 4 |
| 23 | Vinyl chloride | 50 | 400 | 50 | t-BP | 0.5 | 80 | 3 |
| 24 | Vinylidene chloride | 50 | 400 | 50 | t-BP | 0.5 | 80 | 3 |
| 25 | Vinylidene fluoride | 40 | 400 | 60 | t-BP | 0.5 | 80 | 3 |
| 26 | 2-ethylhexyl acrylate | 40 | 400 | 60 | t-BP | 0.5 | 80 | 3 |
| 27 | do | 20 | 800 | 80 | t-BP | 0.5 | 80 | 2 | t-BP = tert-butylperoxide.

TREATMENT OF THE FILLER

Example 28

Approximately 76.5 parts of methyltrichlorosilane is added to about 3,000 parts of a previously moistened sand, mixed thoroughly and allowed to stand for about 10 minutes. The sand is then washed with water until the wash water exhibited a substantially neutral pH. The excess water is then removed and the sand dried in an oven at a temperature of about 110° C. The dried sand is then sifted to remove the large aggregates.

Example 29

Approximately 3,000 parts of sand is treated in accordance with the procedure described in Example 28 except that ethyltrichlorosilane is substituted for the methyltrichlorosilane.

Example 30

Sand is treated in accordance with the procedure described in Example 28 except that methyltriethoxysilane is substituted for the methyltrichlorosilane. The methyltriethoxysilane is dissolved in sufficient dichloromethane to form a 50 percent by weight solution of methyltriethoxysilane.

Example 31

Sand is treated in accordance with the procedure described in Example 30 except that a 10 percent by weight solution of methyltriethoxysilane in dichloromethane is substituted for the 50 percent by weight solution of methyltriethoxysilane.

Example 32

Approximately 3,000 parts of diatomaceous earth is treated in accordance with the procedure described in Example 28.

PREPARATION OF COATING COMPOSITIONS

Example 33

A 5 percent by weight solution of a compound of the formula

$$CH_3Si(OOCCH_3)_2CH_2CH_2Si(OOCCH_3)_3$$

in methylene chloride is brushed on the surface of previously cleaned concrete. The treated surface is allowed to dry for about one hour at a temperature of between about 20° and 30° C.

About 100 parts of the polymer prepared in accordance with the procedure described in Example 2 is mixed with about 350 parts of sand treated in accordance with the procedure described in Example 28. To this mixture is added with agitation about 17 parts of high-flash naphtha, about 1 part of ethyl orthosilicate and about 0.5 part of dibutyltinbutoxychloride. The mixture is then applied to the above primed concrete surface as a coating and allowed to cure. After about one week, the coated surface is very resistant to abrasion and exhibits excellent wear properties.

Example 34

A 5 percent by weight solution of

$$CH_3Si(OOCCH_3)_2CH_2CH_2Si(OOCCH_3)_3$$

in methylene chloride is sprayed on a previously cleaned and dried concrete surface. The treated surface is then allowed to dry for about one hour at a temperature of between about 20° and 30° C.

A composition consisting of about 100 parts of hydroxy-terminated grafted polymer prepared in accordance with the procedure described in Example 2, 350 parts of sand treated in accordance with the description of Example 28, about 10 parts of high-flash naphtha and about 7.5 parts of methyltriacetoxysilane are mixed and added to the above treated concrete surface. The composition is allowed to cure for approximately one week, after which time it exhibits good adhesion to the concrete and is resistant to abrasion.

Example 35

A 5 percent solution of

CH₃Si(OOCCH₃)₂CH₂CH₂Si(OOCCH₃)₃ in methylene chloride is brushed on a cleaned and dried concrete surface. The treated surface is allowed to dry for approximately one hour at a temperature of about 30° C. To the treated surface is added a composition similar to Example 33 except the sand is treated in accordance with the procedure of Example 29. The coating composition exhibits good adhesion to the concrete surface and is resistant to abrasion.

Example 36

A wood surface is coated with a compound having the formula

CH₃Si(OOCCH₃)₂CH₂CH₂Si(OOCCH₃)₃ and allowed to dry for approximately one hour at 30° C.

To a composition containing about 100 parts of hydroxy-terminated grafted polymer prepared in accordance with the procedure of Example 1 is added with agitation about 280 parts of toluene, about 4 parts of ethyl orthosilicate and about 0.3 part of dibutyltinbutoxychloride. The composition is applied to the above treated wood surface and dried for about 24 hours. The coating composition is resistant to abrasion and exhibits excellent adhesion to the wood surface.

Example 37

A composition similar to the composition of Example 36 containing 10 grams of ethyl orthosilicate is applied to a wood surface previously coated with a 50 percent solution of methyltriacetoxysilane in dichloromethylene. The composition is dried for about 18 hours, after which time it is resistant to abrasion and shows excellent adhesion to the wood surface.

Example 38

A composition prepared in accordance with the procedure described in Example 36 except that 20 grams of ethyl orthosilicate is applied to a wood surface previously coated with a 10 percent solution of methyltriacetoxysilane in dichloromethane. The composition is dried for about 12 hours, after which time it is resistant to abrasion and adheres to the wood surface.

Example 39

Approximately 350 parts of sand treated in accordance with the procedure described in Example 28 are mixed with about 100 parts of a hydroxy-terminated grafted polymer prepared in accordance with Example 2, about 2 parts of ethyl orthosilicate and about 16 parts of naphtha (boiling range 100° to 160° C.). To this mixture is added about 0.5 part of dibutyltinbutoxychloride in about 4 parts of naphtha (boiling range 100° to 160° C.) with agitation. The composition is then applied to a concrete surface previously treated with a 5 percent solution of CH₃Si(OOCCH₃)₂CH₂CH₂Si(OOCCH₃)₃ in dichloromethane and dried. After about one week, the coating composition is resistant to abrasion and exhibits excellent adhesion to the concrete surface.

Example 40

Approximately 350 parts of sand treated in accordance with the procedure described in Example 28 are mixed with about 100 parts of a hydroxy-terminated grafted polymer prepared in accordance with Example 2, about 20 parts of naphtha (boiling range 100° to 160° C.), about 6 parts of chrome yellow and about 8 parts of methyltriacetoxysilane. The mixture is applied to a previously cleaned and dried asphalt surface and cured for about one week at a temperature between about 25° and 40° C. The coating composition is resistant to abrasion and showed good adherence to the asphalt surface.

Example 41

(a) About 100 parts of the polymer prepared in accordance with the procedure described in Example 2 is mixed with about 350 parts of sand treated in accordance with the procedure described in Example 28. To this mixture is added with agitation about 20 parts of high-flash naphtha, about 4 parts of ethyl orthosilicate and about 0.3 part of dibutyltinbutoxychloride. The mixture is poured into a mold, cured for about 24 hours and then cured in the air for about 7 days.

(b) About 100 parts of hydroxy-terminated dimethylpolysiloxane (4,000 cps.) is mixed with about 350 parts of sand treated in accordance with the procedure described in Example 28. To this mixture is added with agitation about 20 parts of high-flash naphtha, about 4 parts of ethyl orthosilicate and about 0.3 part of dibutyltinbutoxychloride. The mixture is poured into a mold, cured for about 24 hours and then cured in the air for about 7 days.

A comparison of the physical properties of the materials obtained from Examples 41(a) and (b) are illustrated in Table III.

TABLE III

| Example No. | Hardness ASTM 2240 | Tensile ASTM 412 | Abrasive index ASTM D1630-61 |
|---|---|---|---|
| 41(a) | 92 | 240 | 1,500 |
| 41(b) | 60 | 49 | 0.3 |

A comparison of the results illustrated in the above table clearly shows that the sand-filled grafted polysiloxane polymer exhibits improved hardness, improved tensile strength and greatly improved abrasion resistance over the sand-filled conventional polysiloxane polymers. In fact, it was found that the sand-filled grafted polysiloxane polymer is about 5,000 times more resistant to abrasion than the sand-filled conventional polysiloxanes.

When the above examples are repeated utilizing other hydroxy-terminated grafted polysiloxanes in the presence of other fillers, compositions are obtained which have properties substantially the same as those of the specific examples.

Although specific examples of the invention have been herein described, it is not intended to limit the invention solely thereto, but to include all the variations and modifications falling within the spirit and scope of the appended claims.

The invention claimed is:

1. A coating composition curable at room temperature comprising a mixture of an inert filler and a liquid organopolysiloxane having terminal groups selected from the class consisting of hydroxyl groups and radicals hydrolyzable by ambient moisture and having at least one polymeric organic side-chain linked to a lower alkyl group of said organopolysiloxane, said polymeric organic chain being constituted of recurring units derived from monomers containing ethylenic unsaturation, said monomers being selected from the class consisting of straight chain olefins whether or not attached to an aromatic nucleus, halogenated olefins again whether or not attached to an aromatic nucleus, unsaturated acids, esters of organic acids in which either the esterifying group or the derivative acid is unsaturated, unsaturated amides and unsaturated nitriles.

2. The composition of claim 1 wherein the organopolysiloxane is a substantially linear hydroxy-terminated organopolysiloxane.

3. The composition of claim 1 wherein the inert filler is treated with a silane selected from the group consisting of $R'''SiX_3$ and $(R''')_zSi(OR'''')_{4-z}$ wherein $R'''$ is a monovalent hydrocarbon radical having from 1 to 8 carbon atoms, $R''''$ is an alkyl group having from 1 to 8 carbon atoms, X is a halogen and z is an integer of from 1 to 2.

4. The composition of claim 1 wherein the inert filler is sand.

5. A method for preparing a coating composition which comprises contacting a moist inert filler with a silane selected from the group consisting of $R'''SiX_3$ and $(R''')_zSi(OR'''')_{4-z}$ wherein $R'''$ is a monovalent hydrocarbon radical having from 1 to 8 carbon atoms, $R''''$ is an alkyl group having from 1 to 8 carbon atoms, X is a halogen and z is an integer of from 1 to 2, drying the inert filler and thereafter mixing the filler with a liquid organopolysiloxane having terminal groups selected from the class consisting of hydroxyl groups and radicals hydrolyzable by ambient moisture and having at least one polymeric organic side-chain linked to a lower alkyl group of said organopolysiloxane, said polymeric group being constituted of recurring units derived from monomers containing ethylenic unsaturation, said monomers being selected from the class consisting of straight chain olefins whether or not attached to an aromatic nucleus, halogenated olefins again whether or not attached to an aromatic nucleus, unsaturated acids, esters of organic acids in which either the esterifying group or the derivative acid is unsaturated, unsaturated amides and unsaturated nitriles.

6. The cured composition obtained from a mixture of ingredients comprising (1) an inert filler and (2) a liquid organopolysiloxane having terminal hydroxyl groups and having at least one polymeric organic side-chain linked to a lower alkyl group of said organopolysiloxane, said polymeric organic chain being constituted of recurring units derived from monomers containing ethylenic unsaturation, said monomers being selected from the class consisting of straight chain olefins whether or not attached to an aromatic nucleus, halogenated olefins again whether or not attached to an aromatic nucleus, unsaturated acids, esters or organic acids in which either the esterifying group or the derivative acid is unsaturated, unsaturated amides and unsaturated nitriles, (3) a cross-linking agent selected from the class consisting of polyalkoxysilanes and polyalkoxysiloxanes and (4) a metal salt of a carboxylic acid.

7. The cured composition obtained from a mixture of ingredients comprising (1) an inert filler and (2) a liquid organopolysiloxane having terminal hydroxyl groups and having at least one polymeric organic side-chain linked to a lower alkyl group of said organopolysiloxane, said polymeric organic chain being constituted of recurring units derived from monomers containing ethylenic unsaturation, said monomers being selected from the class consisting of straight chain olefins whether or not attached to an aromatic nucleus, halogenated olefins again whether or not attached to an aromatic nucleus, unsaturated acids, esters of organic acids in which either the esterifying group or the derivative acid is unsaturated, unsaturated amides and unsaturated nitriles, and (3) at least one mol of an acyloxysilane per silicon bonded hydroxyl group, said acyloxysilane selected from the group consisting of $(R_a)_ySi(OAc)_{4-y}$ and $R_aSi(OA_c)_2R_bSi(OA_c)_3$ wherein $R_a$ is a monovalent hydrocarbon radical or a halogenated monovalent hydrocarbon radical having up to 8 carbon atoms, $R_b$ is a divalent hydrocarbon radical having up to 8 carbon atoms, Ac is a saturated aliphatic monoacyl radical derived from a carboxylic acid and y is an integer of from 1 to 2.

8. The composition of claim 6 wherein the cross-linking agent is ethyl silicate.

9. The composition of claim 7 wherein the acyloxysilane is methyltriacetoxysilane.

References Cited

UNITED STATES PATENTS

| | | | |
|---|---|---|---|
| 3,350,330 | 10/1967 | Cash et al. | 260—37(Si)X |
| 3,441,537 | 4/1969 | Lengnick | 260—37(Si)X |

FOREIGN PATENTS

| | | | |
|---|---|---|---|
| 860,327 | 2/1961 | Great Britain | 260—827 |

MORRIS LIEBMAN, Primary Examiner

L. T. JACOBS, Assistant Examiner

U.S. Cl. X.R.

260—827